US005816648A

United States Patent [19]

Baccili et al.

[11] Patent Number: 5,816,648

[45] Date of Patent: Oct. 6, 1998

[54] TRAY SYSTEM FOR BABY STROLLERS

[76] Inventors: Peter E. Baccili; Annette Baccili, both of 8721 Imperial Ct., Tampa, Fla. 33635

[21] Appl. No.: 847,682

[22] Filed: Apr. 28, 1997

[51] Int. Cl.[6] .......... A47B 83/02

[52] U.S. Cl. .......... 297/159.1; 297/173; 297/172; 108/168

[58] Field of Search .......... 297/173, 161, 297/159.1, 148, 149, 153, 188.19, 145, 146, 188.15, 188, 16, 188.17, 163; 108/167, 168, 172

[56] References Cited

U.S. PATENT DOCUMENTS

| | | | |
|---|---|---|---|
| 193,459 | 7/1877 | Payne | 297/163 |
| 595,284 | 12/1897 | Baum | 297/173 X |
| 818,917 | 4/1906 | Ruger | 297/173 |
| 1,178,894 | 4/1916 | Wilcox | 297/153 |
| 2,738,664 | 3/1956 | Edgar | 108/167 X |
| 2,997,739 | 7/1961 | Orsini | 297/188.17 |
| 3,019,493 | 2/1962 | Walenga | 16/223 X |
| 3,773,381 | 11/1973 | Brennan | 297/163 X |
| 4,081,198 | 3/1978 | Penney | 297/153 |
| 4,436,339 | 3/1984 | Albers | 297/153 |
| 4,761,847 | 8/1988 | Savage et al. | 108/167 X |
| 4,795,209 | 1/1989 | Quinlan, Sr. et al. | 297/153 |
| 5,106,156 | 4/1992 | Marquis | 297/153 |
| 5,148,850 | 9/1992 | Urbanick | 160/231.1 |
| 5,185,977 | 2/1993 | Brockman et al. | 52/173 |
| 5,390,976 | 2/1995 | Doughty et al. | 297/188.19 X |
| 5,437,493 | 8/1995 | Weisleder | 297/153 X |
| 5,547,247 | 8/1996 | Dixon | 297/145 |
| 5,562,331 | 10/1996 | Spykerman et al. | 297/188.19 X |
| 5,653,499 | 8/1997 | Goodall | 297/173 X |

FOREIGN PATENT DOCUMENTS

| | | | |
|---|---|---|---|
| 993775 | 11/1951 | France | 108/168 |

*Primary Examiner*—Peter M. Cuomo
*Assistant Examiner*—David E. Allred
*Attorney, Agent, or Firm*—Joseph N. Breaux

[57] ABSTRACT

A tray system that includes a collapsible tray assembly pivotally mounted to an articulated positioning assembly wherein the articulated positioning assembly includes a frame attachment clamp, a left/right positioning adjustment mechanism, a forward/rearward position adjustment mechanism having a tray support arm pivotally mounted to the collapsible tray assembly, a tray angle adjustment mechanism, and a support arm angle adjustment mechanism; and wherein the collapsible tray assembly includes a two-part tray mechanism including a left tray member, a right tray member, and a sealing gasket, the left and right tray members being secured together by a pair of hinges and lockable with a locking mechanism in an unfolded configuration, the sealing gasket being compressed between left and right edge portions of the left and right tray members when the left and right tray members are locked in an unfolded configuration, each left and right tray member including a recessed portion partially defined by a perimeter fluid channeling trough.

1 Claim, 2 Drawing Sheets

TRAY SYSTEM FOR BABY STROLLERS

TECHNICAL FIELD

The present invention relates to support trays and more particularly to a tray system that is installable on a conventional baby stroller and that includes a collapsible tray assembly pivotally mounted to an articulated positioning assembly wherein the articulated positioning assembly includes a frame attachment clamp, a left/right positioning adjustment mechanism, a forward/rearward position adjustment mechanism having a tray support arm pivotally mounted to the collapsible tray assembly, a tray angle adjustment mechanism, and a support arm angle adjustment mechanism; and wherein the collapsible tray assembly includes a two-part tray mechanism including a left tray member, a right tray member, and a sealing gasket, the left and right tray members being secured together by a pair of hinges and lockable with a locking mechanism in an unfolded configuration, the sealing gasket being compressed between left and right edge portions of the left and right tray members when the left and right tray members are locked in an unfolded configuration, each left and right tray member including a recessed portion partially defined by a perimeter fluid channeling trough.

BACKGROUND OF THE INVENTION

Children seated within conventional baby strollers often become bored. It would be a benefit, therefore, to have a tray system that can be secured to the frame of a conventional baby stroller for holding and supporting toys, food, drinks and the like. Because only a small area of the tray may be needed at some times, it would be a further benefit if the tray system included a tray assembly that included a tray mechanism that could be configured in at least two modes to provided trays of two different sizes. In addition, because a child seated in a stroller can become exposed to sun for extended periods of time, it would also be a benefit to have a tray system that can be easily configured as a shade element to shade the seat area of a stroller if desired.

SUMMARY OF THE INVENTION

It is thus an object of the invention to provide a tray system for baby strollers.

It is a further object of the invention to provide a tray system for baby strollers that can be secured to the frame of a conventional baby stroller.

It is a still further object of the invention to provide a tray system for baby strollers that includes a tray assembly having a tray mechanism that is configurable in at least two modes to provided trays of two different sizes.

It is a still further object of the invention to provide a tray system for baby strollers that is configurable as a shade element to shade the seat area of a stroller.

It is a still further object of the invention to provide a tray system for baby strollers that includes a collapsible tray assembly pivotally mounted to an articulated positioning assembly wherein the articulated positioning assembly includes a frame attachment clamp, a left/right positioning adjustment mechanism, a forward/rearward position adjustment mechanism having a tray support arm pivotally mounted to the collapsible tray assembly, a tray angle adjustment mechanism, and a support arm angle adjustment mechanism; and wherein the collapsible tray assembly includes a two-part tray mechanism including a left tray member, a right tray member, and a sealing gasket, the left and right tray members being secured together by a pair of hinges and lockable with a locking mechanism in an unfolded configuration, the sealing gasket being compressed between left and right edge portions of the left and right tray members when the left and right tray members are locked in an unfolded configuration, each left and right tray member including a recessed portion partially defined by a perimeter fluid channeling trough.

It is a still further object of the invention to provide a tray system for baby strollers that accomplishes some or all of the above objects in combination.

Accordingly, a tray system for baby strollers is provided. The tray system includes a collapsible tray assembly pivotally mounted to an articulated positioning assembly wherein the articulated positioning assembly includes a frame attachment clamp, a left/right positioning adjustment mechanism, a forward/rearward position adjustment mechanism having a tray support arm pivotally mounted to the collapsible tray assembly, a tray angle adjustment mechanism, and a support arm angle adjustment mechanism; and wherein the collapsible tray assembly includes a two-part tray mechanism including a left tray member, a right tray member, and a sealing gasket, the left and right tray members being secured together by a pair of hinges and lockable with a locking mechanism in an unfolded configuration, the sealing gasket being compressed between left and right edge portions of the left and right tray members when the left and right tray members are locked in an unfolded configuration, each left and right tray member including a recessed portion partially defined by a perimeter fluid channeling trough.

BRIEF DESCRIPTION OF DRAWINGS

For a further understanding of the nature and objects of the present invention, reference should be made to the following detailed description, taken in conjunction with the accompanying drawings, in which like elements are given the same or analogous reference numbers and wherein.

DESCRIPTION OF THE EXEMPLARY EMBODIMENT

Figure 1:
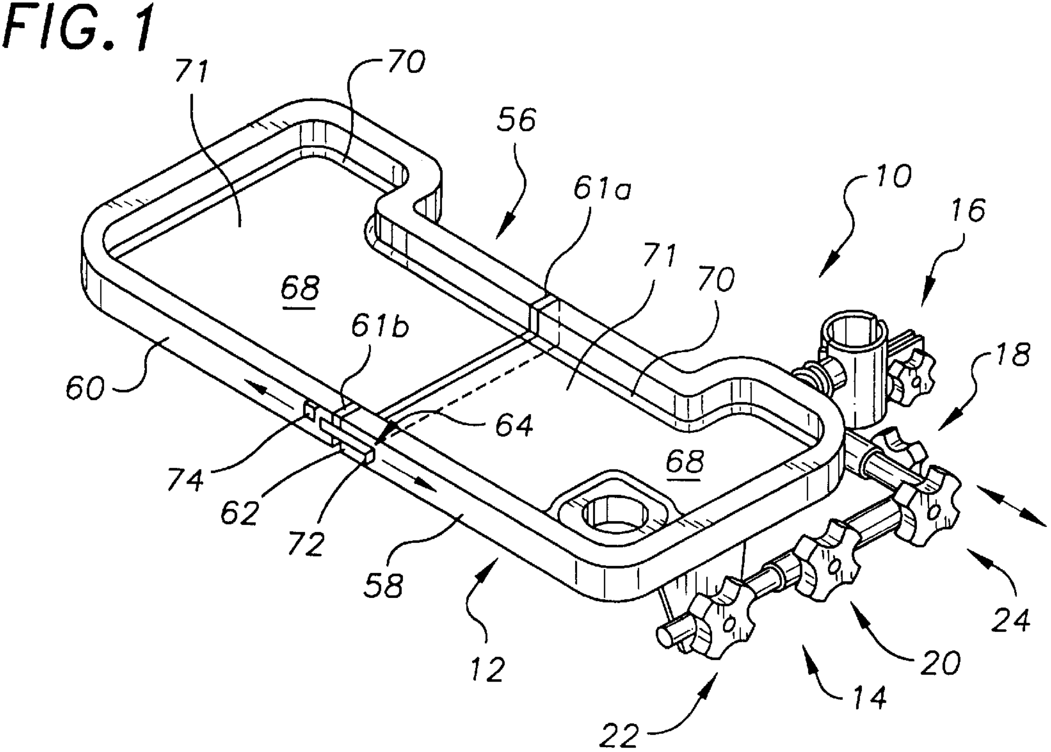
FIG. 1 a perspective view of an exemplary embodiment of the tray system for baby strollers of the present invention showing the collapsible tray assembly and the articulated positioning assembly.

FIG. 1 shows an exemplary embodiment of the tray system for baby strollers of the present invention generally designated by the numeral 10. Tray system 10 includes a collapsible tray assembly, generally designated by the numeral 12, that is pivotally mounted to an articulated positioning assembly, generally designated by the numeral 14. Articulated positioning assembly 14 includes an attachment clamp, generally designated 16; a left/right positioning adjustment mechanism, generally designated 18; a forward/rearward position adjustment mechanism, generally designated 20; a tray angle adjustment mechanism, generally designated 22; and a support arm angle adjustment mechanism, generally designated 24.

Figure 2:
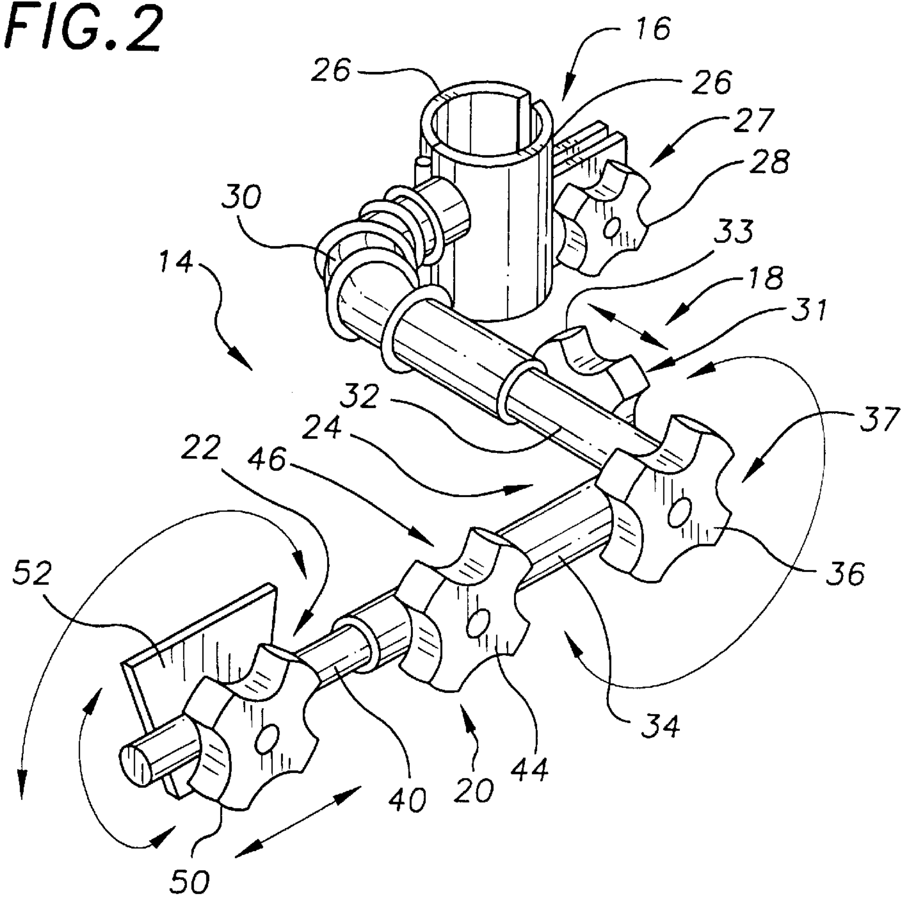
FIG. 2 is a perspective view of the articulated positioning assembly of FIG. 1 in isolation showing the frame attachment clamp, the left/right positioning adjustment mechanism, the forward/rearward position adjustment mechanism including the tray support arm, the tray angle adjustment mechanism, and the support arm angle adjustment mechanism.

With reference to FIG. 2, attachment clamp 16 is of stamped metal construction and includes a pair of clamping jaws 26 that are forced together by a screw mechanism 27 having a plastic knob 28. A right angled section of metal tubing 30 extends from the side of attachment clamp 16. A first straight section of metal tubing 32 is slidable within metal tubing length 30 to form a first telescoping mechanism and together with a first screw type clamp mechanism, generally designated 31, operable by a knob 33 constitute left/right positioning adjustment mechanism 18.

A second straight section of metal tubing 34 extends radially away from and pivotally with respect to first straight section of metal tubing 32. Second straight section of metal tubing 34 is pivotal into a desired angular position and locked in place by tightening a knob 36 that forms a portion of a second screw type clamp mechanism, generally designated 37. First and second straight sections of tubing 32,34 and screw type clamp mechanism 37 form support arm angle adjustment mechanism 24.

A third straight section of metal tubing 40 forms a support arm and is slidable within second straight section of metal tubing 34. Second and third sections of metal tubing 34,40 are lockable in fixed relationship to each other by tightening a knob 44 forming a portion of a third screw type clamp 46. Second and third sections of metal tubing 34,40 form a second telescoping mechanism and in combination with a third screw clamp 46 form forward/rearward position adjustment mechanism 20.

Tray angle adjustment mechanism 22 is positioned at the end of third section of metal tubing 40 and includes a screw clamp 50 and a tray connecting flange 52. In this embodiment, tray connecting flange 52 is integrally formed with left tray member 58 (FIG. 1) of tray assembly 12 and is shown detached therefrom and in isolation in FIG. 2 for illustrative purposes only.

With reference back to FIG. 1, collapsible tray assembly 12 includes a two-part tray mechanism, generally designated 56 including a left tray member 58 and a right tray member 60 hingedly connected by hinges 61*a*,61*b*; a sealing gasket 62 (more clearly shown in FIG. 4); and a locking mechanism, generally designated 64. Left and right tray members 58,60 are molded from rigid ABS plastic and each includes a recessed portion 68 that is partially defined by a perimeter fluid channeling trough 70 for channeling fluids away from tray surfaces 71. When left and right tray members 58,60 are pivoted into the unfolded configuration shown in FIG. 1, they are lockable together by sliding a locking bolt 72 of locking mechanism 64 into a bolt receiving channel member 74. In this embodiment, locking bolt 72 is slidably mounted on a side surface of left tray member 58 and bolt receiving channel member 74 is mounted to a side surface of right tray member 60.

Figure 4:
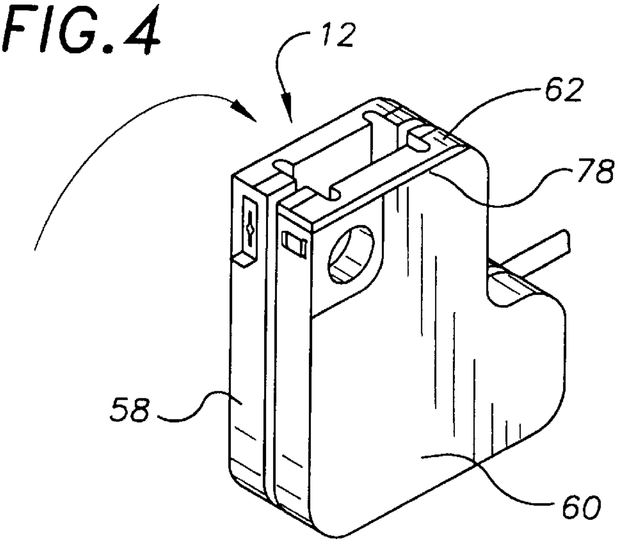
FIG. 4 is a perspective view of the collapsible tray in the folded and rotated about the support arm.

With reference to FIG. 4, in this embodiment sealing gasket 62 is constructed from resilient plastic and is positioned onto an edge surface 78 of right tray member 60. Referring back to FIG. 1, when left and right tray members 58,60 are locked in the unfolded configuration sealing gasket 62 forms a watertight seal between left and right tray members 58,60.

Figure 3:
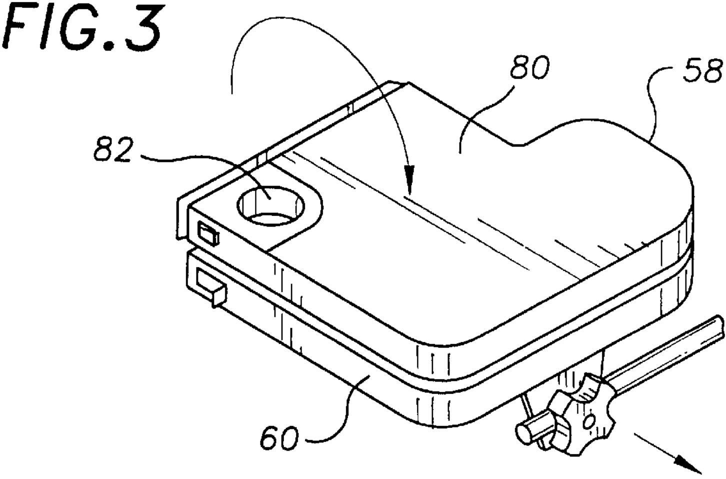
FIG. 3 is a perspective view showing the collapsible tray assembly in the folded configuration.
Figure 5:
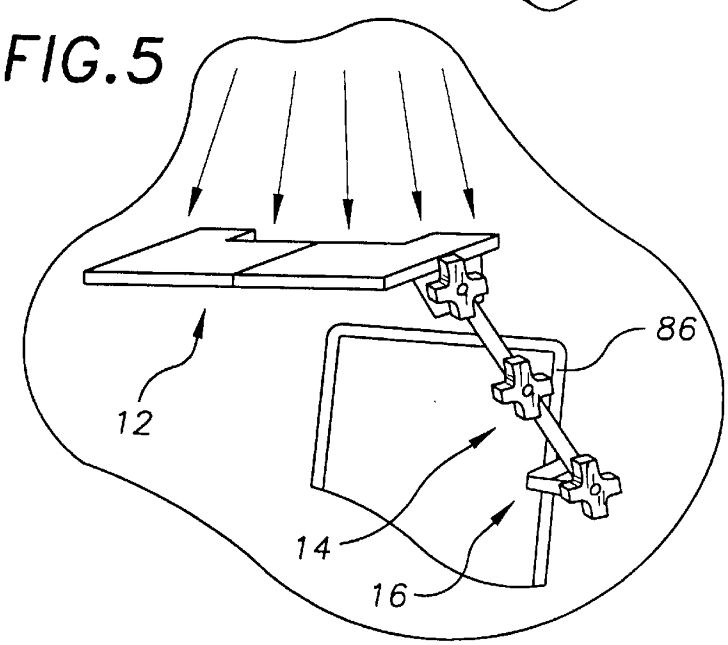
FIG. 5 is a perspective view showing the exemplary tray system of FIG. 1 installed onto the frame of a representative baby stroller and configured for use as a sun shield.

With reference now to FIG. 3, left and right tray members 58,60 can be folded into the folded configuration to form a smaller sized tray surface if desired. When in the folded configuration a back surface 80 of right tray member 60 can be used as a second smaller tray surface when a smaller tray surface is desired. Back surface 80 is provided with a cylindrically shaped cup holder 82 for convenience. With reference to FIG. 4, if it is not desired to use any tray, tray assembly 12 is folded away from the stroller seat and stored by manipulating articulated positioning assembly 14 (FIGS. 1,2). Referring now to FIG. 5, in some circumstances it may desirable to use tray assembly 12 as a sun screen for a child seated in the stroller. This is accomplished by positioning attachment clamp 16 at a desired level along stroller frame 86 and manipulating articulated positioning assembly 14 until tray assembly 12 is in the desired position.

It can be seen from the preceding description that a tray system for baby strollers has been provided that can be secured to the frame of a conventional baby stroller; that includes a tray assembly having a tray mechanism that is configurable in at least two modes to provided trays of two different sizes; that is configurable as a shade element to shade the seat area of a stroller; and that includes a collapsible tray assembly pivotally mounted to an articulated positioning assembly wherein the articulated positioning assembly includes a frame attachment clamp, a left/right positioning adjustment mechanism, a forward/rearward position adjustment mechanism having a tray support arm pivotally mounted to the collapsible tray assembly, a tray angle adjustment mechanism, and a support arm angle adjustment mechanism; and wherein the collapsible tray assembly includes a two-part tray mechanism including a left tray member, a right tray member, and a sealing gasket, the left and right tray members being secured together by a pair of hinges and lockable with a locking mechanism in an unfolded configuration, the sealing gasket being compressed between left and right edge portions of the left and right tray members when the left and right tray members are locked in an unfolded configuration, each left and right tray member including a recessed portion partially defined by a perimeter fluid channeling trough.

It is noted that the embodiment of the tray system for baby strollers described herein in detail for exemplary purposes is of course subject to many different variations in structure, design, application and methodology. Because many varying and different embodiments may be made within the scope of the inventive concept(s) herein taught, and because many modifications may be made in the embodiment herein detailed in accordance with the descriptive requirements of the law, it is to be understood that the details herein are to be interpreted as illustrative and not in a limiting sense.

What is claimed is:

1. A tray system for baby strollers comprising: an articulated positioning assembly including:

a frame attachment clamp, a left/right positioning adjustment mechanism, a forward/rearward position adjustment mechanism having a tray support arm, a tray angle adjustment mechanism, and a support arm angle adjustment mechanism; and a collapsible tray assembly pivotally mounted to said tray support arm of said forward/rearward position adjustment mechanism, said collapsible tray assembly including a two-part tray mechanism including a left tray member, a right tray member, and a sealing gasket constructed from a resilient compressible material, said left and right tray members being secured together by a pair of hinges and lockable with a locking mechanism in an unfolded configuration, said sealing gasket being compressed between, right and left edge portions of said left and right tray members respectively when said left and right tray members are locked in an unfolded configuration, each said left and right tray member including a recessed portion partially defined by a perimeter fluid channeling trough;

said left/right positioning adjustment mechanism being telescoping mechanism;

said forward/rearward position adjustment mechanism is a telescoping mechanism;

said attachment clamp including a pair of clamping jaws that are forced together by a screw mechanism;

said locking mechanism including a sliding locking bolt and a bolt receiving channel member, said locking bolt being slidably mounted on a side surface of one of said left and right tray members, said bolt receiving channel member being mounted to the remaining said left and right tray member;

a back surface of said right tray member having a portion, thereof suitable for use as a tray surfaces with the tray in a folded configuration said back surface further having a cup holder recess formed therein.

* * * * *